United States Patent [19]
Frey

[11] 3,867,954
[45] Feb. 25, 1975

[54] CORROSION INHIBITION IN SLURRY PIPELINES OPERATED BY GRAVITY

[75] Inventor: Robert J. Frey, Pleasant Hill, Calif.

[73] Assignee: Bechtel International Corporation, San Francisco, Calif.

[22] Filed: June 6, 1973

[21] Appl. No.: 367,630

[52] U.S. Cl................. 137/1, 137/142, 141/286, 141/392, 302/14, 302/64, 302/66
[51] Int. Cl............................................. B65g 53/30
[58] Field of Search ........................... 137/142–144, 137/1; 141/392, 286; 302/14, 64, 66

[56] References Cited
UNITED STATES PATENTS

| | | | |
|---|---|---|---|
| 485,953 | 11/1892 | Leedy | 137/142 X |
| 3,575,469 | 4/1971 | Meyer | 302/14 |

*Primary Examiner*—Houston S. Bell, Jr.
*Assistant Examiner*—Frederick R. Schmidt

[57] ABSTRACT

In the transportation of solids in slurry form, one of the problems encountered is corrosion of the interior of the pipeline because of the presence of air. The pipeline construction proposed ensures that air does not enter the pipeline. Under an air-free condition, corrosion can be held to a reasonable value to ensure that the pipe will last for a time period of the order of 40 years. The slurry can include as a solid phase such diverse materials as limestone and other cement raw materials, iron concentrates, coal, gilsonite, phosphate rock, various mineral tailings, kaolin, copper concentrates, sewage sludge, potash, lead-zinc concentrates, nickel concentrates, pyrite, coke and wood chips. The above list is not exclusive for most freshly comminuted materials, for example, have a reducing property on their new surfaces. For example, all sulfides including chalcopyrite, iron pyrites, lead-zinc sulfides react with oxygen to form the sulfates.

8 Claims, 5 Drawing Figures

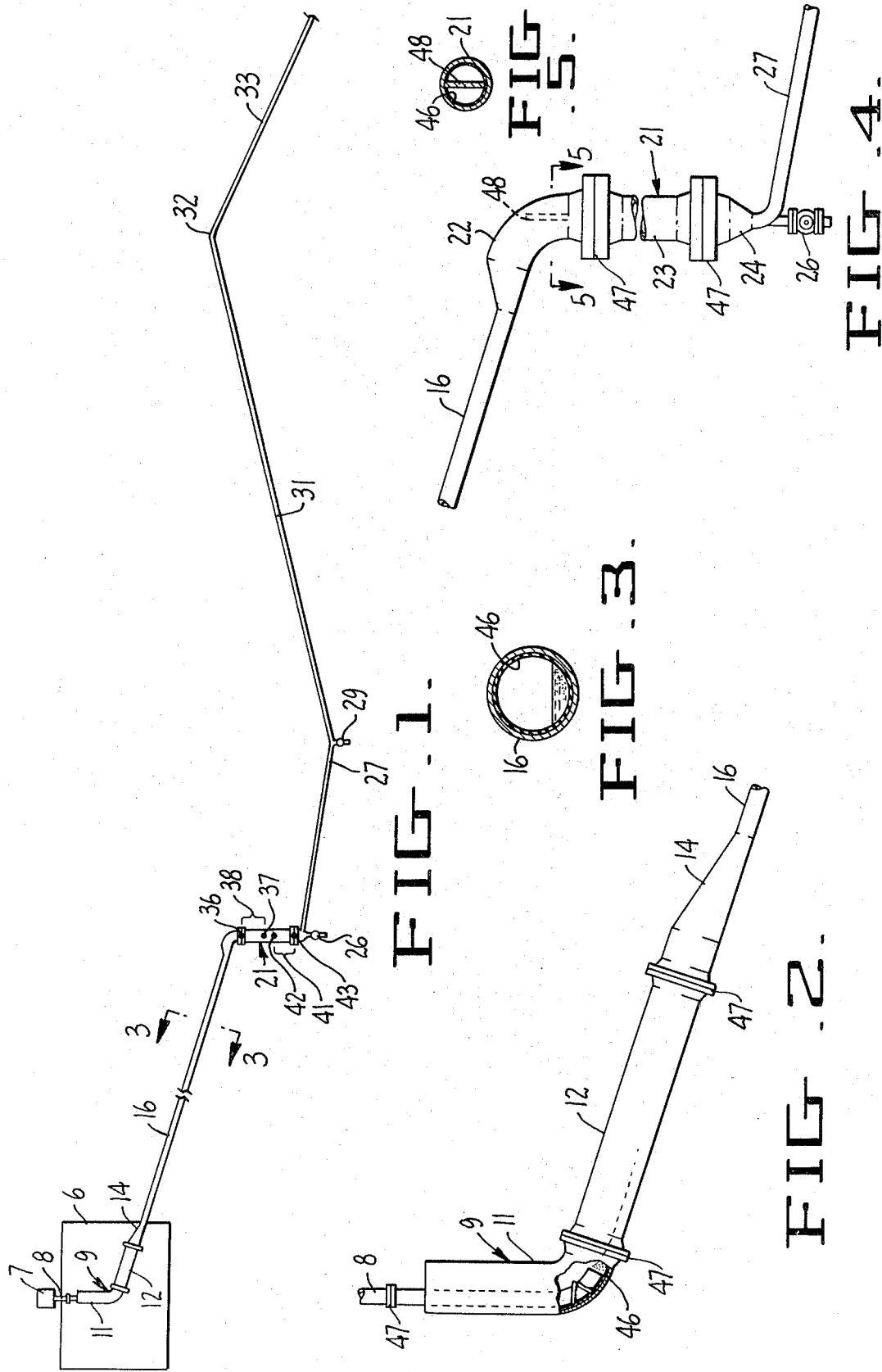

CORROSION INHIBITION IN SLURRY PIPELINES OPERATED BY GRAVITY

BACKGROUND OF THE INVENTION

Corrosion is inhibited in a gravity operated slurry pipeline by preventing air entrainment. Further, the pipeline slope is of a constant value between the point of entry of the slurry and an air escape riser. This prevents the formation of "hydraulic jumps" with consequential air entrainment. A "hydraulic jump" occurs when a flowing liquid with a free surface undergoes an abrupt increase in the depth of the liquid accompanied by a corresponding decrease in the rate of flow as a result of meeting a more level slope or an obstruction and thus becomes quite aerated. Further, the diameter of the constant slope section is such that the pipeline flows only partially full, thereby preventing entry of air into the pipeline by aspiration. Usually the pipeline is only filled to about a quarter of its volumetric capacity.

SUMMARY OF THE INVENTION

It is in general the broad object of the present invention to provide a pipeline construction for transporting a slurry by gravity and under conditions such that air is absent whereby corrosion of the pipeline is held to a minimum, the anticipated life of the pipeline being of the order of 40 years or more.

BRIEF DESCRIPTION OF THE DRAWINGS

FIG. 1 is a side elevation showing the construction in one embodiment of the invention of the initial portion of the pipeline of the length of approximately 360 feet and which ensures that the air entrapment does not occur so air is not present in the major portion of the pipeline.

FIG. 2 is a side elevation partly in section of a device which ensures that air will not be trapped in the pipeline, this device serving to anticipate the "hydraulic jump" formed at the beginning of the pipeline where the pipe is mounted on the slurry tank.

FIG. 3 is a section taken through the pipeline on the line 3—3 showing the volume of flow in the pipeline.

FIG. 4 is a side elevation showing the air escape riser detail for ensuring the release of air before it enters the major length of the pipeline.

FIG. 5 is a section along the line 5—5 in FIG. 4.

DESCRIPTION OF THE PREFERRED EMBODIMENT

Slurry is formed in the tank 6 and is fed into a splitter box 7 from which it passes through pipe 8 into the air dissipating device 9 as shown in FIG. 2. In one embodiment of the invention, the pipe 8 is 8 inches in diameter while the air dissipating device includes a length of 24 inch diameter pipe 11 extending vertically and being joined to a further length of 24 inch pipe indicated at 12. The interior of the 24 inch pipes 11 and 12 are rubber lined. The upper end of pipe 11 is open to the atmosphere so that entrapped air can be released readily. At the lower end of pipe section 12, a tapered section 14 is provided tapering the 24 inch pipe down to pipe 16 of a 9 inch diameter. The pipe 16 extends for some 240 feet to the air escape riser shown in FIG. 4 and generally indicated at 21. Again, the 9 inch pipe 16 is joined to a 24 inch ell 22 which, in turn, is joined to a rubber lined vertical section 23 also of 24 inch size. At its lower end the air escape riser is provided with a conical base 24 having a drain valve 26 and being connected to another length of pipe 27, this being of 8 inch diameter. The pipe length 27 extends for some 22 feet at an angle of about 9° to the horizontal. At its lower end pipe 27 has a drain outlet 29. An upwardly extending section of pipe 31, also of 8 inch in diameter, extends upwardly at an angle of 18° for approximtaely 100 feet to an elevated point 32 at which it is joined to another length of pipe 33, also 8 inches in diameter, which extends downwardly to a point of use for the slurry, this being many miles away from point 32; in one installation this length is 30 miles. The air escape riser 21 and pipe sections 27 and 31 provide, in effect, a U-tube.

In operation, the pipeline is capable of transporting 1,020 gallons per minute at a 60 percent solids concentration. The construction described is such that a "hydraulic jump" that might form and entrain air will not occur in the vertical riser 21. Also any air slugs which may enter the system in the splitter box will separate from the liquid in the pipe 12, 14 and 16 because the flow in these sections will be such that the pipe will be only partially full and the slurry (or water) will always have a free surface exposed to atmospheric pressure. The maximum depth of flow will be about 2.5 inches which corresponds to occcupying only 28 percent of the total volume of the pipe.

The 9 inch I.D. rubber lined pipe ensures that in the event the pipeline becomes flooded for any reason (such as the loss of vacuum downstream of the U-tube) flow will nevertheless be maintained above the deposition velocity (4 fps) when pumping at the minimum flow rate (800 gallons per minute).

In the vertical riser with its 24 inch diameter flanged spool, the velocity of flow varies between 0.62 fps (800 gallons per minute) and 0.79 fps (1,020 gallons per minute).

There is no apparent reason for air to be present in the slurry at the time it enters the riser. Nevertheless, the riser permits larger bubbles of entrained air to escape if these be present. On the basis of calculations and laboratory observations, it is possible, at these flow rates, for air bubbles 0.06 inch in diameter and larger to rise to the surface and not be carried through the riser.

An S-shaped air lock is formed by air escape riser 21, line 27, line 31 and line 33. Point 32 is situated at an elevation relative to point 29 such that the siphoning vacuum in line 33 will not be broken.

Point 36 indicates the slurry level of a 60 percent solids concentration slurry flowing at 1,020 gpm. Point 37 indicates the slurry level of a 50 percent concentration slurry at no flow. The area 38 between points 36 and 37 denotes the operating envelope. A flushing envelope 41 is depicted by the area between water level 42 (indicating flushout water at 7 fps) and water level 43 (indicating water at no flow).

It will be seen that the operating envelope 38 of the corrosive slurry intersects the pipeline within the air escape riser 21 such that the air slurry interface is in the rubber lined expendable part of the pipeline; furthermore, it will be seen that the flushing envelope 41 of the corrosive water intersects the pipeline within the air escape riser 21 such that the air water interface is in the rubber lined expendable part of the pipeline. These, combined with the removal of any entrained air in the partially full pipe 16 and the removal of air slugs in the air escape riser 21 plus the elimination of a "hydraulic jump" in pipe 16 and the riser 21, ensure that the pipeline beyond drain 26 will be kept free from any corroding air.

Although air may still enter the pipe sections and devices and riser above drain 26, they are protected by rubber lining 46 and are formed with flanged connections 47 for convenient replacement. A deflector plate 48 may be situated at the top of air escape riser 21 to further eliminate air entrainment.

Occasionally the pipeline will be flushed with water. In order to do so the elevation of the top of pipe 8 must be such that when the interface of water and slurry is at point 29 (i.e., when slurry is in pipes 31 and 33; and water is in pipes 8, 9, 12, 14, and 16, riser 21 and pipe 27) the water head at point 29 will be greater than the slurry head at that point (even if pipe 33 is at atmospheric pressure) thereby causing water to displace the slurry and flow into pipes 31 and 33.

I claim:

1. A method of transporting a slurry in a pipeline to maintain the pipeline substantially free of corrosion, comprising the steps of introducing a slurry from a source of slurry into a pipeline, flowing the slurry through the pipeline under the action of gravity, deaerating the slurry by maintaining a first downwardly extending portion of the pipeline only partially full of slurry and at a constant slope, and passing the slurry through an air lock and to a point of slurry discharge at a level lower than the source of slurry and while maintaining the slurry substantially free of air, thus substantially eliminating corrosion of the pipeline due to the presence of air therein.

2. A slurry pipeline in which the slurry is moved by gravity, comprising a slurry containing tank, an air dissipating means connected with the slurry tank to receive slurry therefrom, said air dissipating means being only partially full of slurry when in use and open to atmosphere for removal of air from the slurry, a first pipeline connected at one end to the air dissipating means and extending downwardly therefrom at a constant slope and only partially full of slurry thus preventing entry of air into the pipeline by aspiration, a vertical air escape riser connected to the lower end of the first pipeline and enabling air entrained in the slurry to escape, a second pipeline connected at one end to the lower end of the riser and extending downwardly therefrom, a third pipeline connected to the lower end of the second pipeline and extending upwardly therefrom at least to a level approximating the level of the riser, and a fourth pipeline connected to the upper end of the third pipeline and extending downwardly therefrom to a slurry discharge point at a level lower than the slurry tank, said riser and second, third and fourth pipelines comprising an air lock and the upper end of the third pipeline being at an elevation relative to the lower end thereof such that vacuum in the fourth pipeline is not broken, the second, third and fourth pipelines thus being free of any air-slurry interface and the slurry in these pipelines being substantially free of entrained air, with the result that corrosion due to the presence of air in the pipeline is substantially eliminated.

3. A pipeline as in claim 2, wherein the air dissipating means and riser are rubber lined.

4. A pipeline as in claim 2, wherein the first pipeline has a larger diameter than the second and third pipelines.

5. A pipeline as in claim 4, wherein the first pipeline is at least twice as long as either of the second and third pipelines.

6. A pipeline as in claim 5, wherein the second pipeline extends at an angle of about 9° relative to the horizontal.

7. A pipeline as in claim 6, wherein the third pipeline extends at an angle of about 18° relative to the horizontal.

8. A pipeline as in claim 4, wherein the second, third and fourth pipelines have substantially the same diameters.

* * * * *